(12) United States Patent
Fitz

(10) Patent No.: US 6,213,553 B1
(45) Date of Patent: Apr. 10, 2001

(54) SEAT ELEMENT

(76) Inventor: Wolfgang Fitz, 2 Joshua Path, South Natick, MA (US) 01760

( * ) Notice: Subject to any disclaimer, the term of this patent is extended or adjusted under 35 U.S.C. 154(b) by 0 days.

(21) Appl. No.: 09/295,899

(22) Filed: Apr. 21, 1999

Related U.S. Application Data

(63) Continuation-in-part of application No. 08/770,475, filed on Dec. 20, 1996, now abandoned.

(30) Foreign Application Priority Data

Dec. 21, 1995 (DE) ................................. 195 47 964

(51) Int. Cl.$^7$ ....................................... A47C 1/02
(52) U.S. Cl. ................. 297/314; 297/195.1; 297/215.15
(58) Field of Search ..................... 297/201, 196, 297/209, 214, 313, 314, 310, 325, 326, 329, 258.1, 259.4, 267.1, 270.1, 302.3, 315, 195.1, 215.13, 215.15

(56) References Cited

U.S. PATENT DOCUMENTS

| | | | | |
|---|---|---|---|---|
| 357,059 | * | 2/1887 | Banks | 297/314 |
| 468,398 | * | 2/1892 | Sherman | 297/314 X |
| 2,519,163 | * | 8/1950 | Turner | 297/314 X |
| 3,944,279 | * | 3/1976 | Blackstock et al. | 297/314 X |
| 5,588,704 | * | 12/1996 | Harza | 297/314 |

FOREIGN PATENT DOCUMENTS

| | | | | |
|---|---|---|---|---|
| 1041106 | * | 10/1953 | (FR) | 297/195.1 |
| 449565 | * | 6/1949 | (IT) | 297/314 |

* cited by examiner

*Primary Examiner*—Laurie K. Cranmer
(74) *Attorney, Agent, or Firm*—Hale and Dorr LLP

(57) ABSTRACT

A bicycle seat especially suitable for mountain and road bikes. The bicycle seat includes a seating surface that tilts along an axis positioned at the middle of the distance between the ischial tuberosities.

18 Claims, 11 Drawing Sheets

FEMALE PELVIS

MALE PELVIS

POSTITION OF THE AXIS

VIEW FROM THE BACK

SEAT ELEMENT

This is a Continuation-In-Part of U.S. patent application Ser. No. 08/770,475 filed Dec. 20, 1996, now abandoned the disclosure of which is incorporated by reference.

BACKGROUND OF THE INVENTION

1. Field of the Invention

The present invention relates to a seat element, and more particularly to a bicycle seat, the bicycle seat being especially suitable for mountain and road bikes.

2. Description of Prior Art

As a result of the increasing number of activities which are practiced when seated, such as for example desk work or protracted periods of traveling in a motor vehicle, the complaints resulting from back pain have increased considerably in the last years. The main cause for the occurrence of these complaints are incorrect seating elements which bring about an incorrect sitting position.

However, the occurrence of back pains can also not be fully prevented even by orthopedically correctly shaped seats and a correct sitting position. A correct sitting position can also lead to back problems if this correct sitting position is rigidly maintained for too long a period, i.e. without movement of the spine. Since the intervertebral discs only alternately suck up nutritious liquid and discharge liquid depleted of nutrition with a movement of the spine, an adequate supply of the discs is also not present with a rigid seating position. Accordingly, a correct sitting position can lead to an undersupply of the discs if it is maintained rigidly over a long period of time, and can thus lead to premature wear with the corresponding complaints.

Non-traumatic pain syndromes experienced by bicyclists are the most common type of pain syndromes experienced by bicyclists. For example, at the 1976 Bikecentennial Tour, a sample of 89 cyclists were interviewed and all experienced saddle soreness, and more particularly, 9% had severe symptoms including marked saddle soreness while 7% had crotch numbness. Recently, 86% of 132 cyclists participating in a 500 mile long tour reported symptoms experienced from the ride and 64% experienced buttock pain. The rate of buttock pain exceeded the rate of nearly all of the other related symptoms and 52% of those with buttock pain required a change in riding style or a temporary cessation of cycling.

Typically, up to 72% of cyclists experience pain, redness and tenderness of the skin overlying the ischial tuberosity, which then increases with riding time and can progress to skin ulceration. It is believed that the mechanism of injury is probably a combination of sheering forces and pressure that causes necrosis. Additional prophylactic padding on the saddle and the use of well-padded bicycle pants over the ischial tuberosity as well as the use of a seat that is a few inches wider than the distance between the ischial tuberosities has been suggested.

During cycling, the pelvis moves from one side to the other. High friction and insufficient padding over a certain amount of time result in the aforementioned buttock pain and skin ulceration.

SUMMARY OF THE INVENTION

The present invention provides a seat element comprising a base unit and a seat surface which has a front edge and a rear edge, with at least a part of the seat surface being tiltable relative to the base unit about at least one main axis, wherein the main axis extends from the front to the rear edge of the seat surface, wherein the main axis is arranged spaced by a maximum of 10 cm from the seat surface, wherein the tilting angle of the tiltable part of the seat surface is restricted to a maximum tilt angle and wherein the maximum tilt angle amounts to at most ±15° relative to the central position of the tiltable part of the seat surface.

Through the seat element formed in accordance with the invention a situation is achieved in which the lumbar segments of movement of the spine are in motion when sitting, so that the intervertebral discs can pick up adequate nutrients. As a result of the tilt axis extending from the front edge to the rear edge of the seat surface a lateral tilting movement of the pelvis is achieved, which, on the one hand, is perceived as unobtrusive and particularly pleasant, and on the other hand, enables an ideal movement of the lumbar vertebrae and thus an ideal supply of the intervertebral discs.

It is important that, on the one hand, the tilt axis is arranged as closely as possible to the ischial tuberosities of a person sitting on the seat element, and, on the other hand, that the maximum tilt angle is restricted to a relatively low value.

Through the said arrangement of the tilt axis it is ensured that at the same time as the pelvis is tilted only a very small or indeed no lateral displacement of the pelvis occurs. A lateral displacement of this kind would in particular cause an increased pelvic tilting with a spine fixed in an eventually present backrest and would thus increasingly move the lower lumbar segments of motion. In this way extents of movement would be achieved which approach the passive maximum extent of movement and would thus lead to increased ligamentary disc stresses, which can be perceived as unpleasant and thus reduce or negate the desired effect.

The restriction of the maximum tilt angle is important for the invention because an overextension of the spine and also overextensions of the capsules of discs must be avoided. The tilting movement may not therefore take place between the maximum possible tilt angles for a particular person but must rather lie in a physiologically reasonable range. An overextension of the spine and of the corresponding discs would lead to low back pains and thus run contrary to the sense of the invention. Extreme positions which are indeed possible, but which are, however, perceived to be unpleasant, or are even dangerous in the long term, are effectively avoided by restricting the tilt angle.

A further advantage of the invention lies in the fact that through the tilting of the pelvis in only a small angular range the movements of the lower lumbar vertebral column can be compensated for by corresponding countermovements of the upper lumbar vertebral column. In this way no or only slight movements of the thoracic spine occur so that the stability when seated is retained. This is in particular of importance when using a seat element formed in accordance with the invention in a motor vehicle.

In accordance with an advantageous embodiment of the invention the maximum tilt angle is adjustable. This ensures that the extent of the movements of the spine associated with the tilting can be ideally matched to the particular person. For elderly people in particular the mobility of the spine is restricted so that for such people the maximum tilt angle must be reduced relative to the maximum tilt angle for younger people. If this was not done, overextensions of the capsules or discs would occur as a result of the bending of the spine being too large and would lead to back pains. Accordingly, an ideal adaptation of the seat element formed in accordance with the invention to the physiological characteristics of different persons is possible through the adjustability of the maximum tilt angle.

In accordance with a further preferred embodiment of the invention, restriction elements are provided which restrict the maximum tilt movement of the tiltable part of the seat surface. In this manner a particularly simple and cost-favorable design of the restriction of the maximum tilting movement is possible. In particular the restriction elements can be adjustable in order to thereby achieve the adjustability of the maximum tilt angle. The restriction elements can in this respect also be so differentially adjustable that the maximum tilt angle in one tilt direction has a different magnitude in comparison to the maximum tilt angle in the opposite tilt direction. The maximum tilt angle can, however, also be of the same size in both directions of tilting.

The restriction elements are preferably made resilient for the damped restriction of the maximum tilting movement, so that an abrupt restriction of the tilting movement, which would stress the spine, is avoided. For this purpose the restriction elements can, for example, be formed of resilient material, such as rubber or plastic, or springs, or can be supported in damped manner via resilient materials or springs. However, a magnetic, pneumatic or hydraulic damping of the restriction elements is, for example, also possible.

In accordance with a further expedient embodiment, the main axis lies essentially parallel to the tiltable part of the seat surface. In this way it is ensured that the seat surface and thus also the pelvis and the thighs of the person sitting on the seat execute a pure tilting movement without a translational component to the side. Should such a translational sideways movement be desired in particular cases, then the main axis can also be arranged obliquely to the tiltable part of the seat surface.

In accordance with a further advantageous embodiment of the invention the main axis extends substantially in the center between the side edges of the seat surface. Through this symmetrical arrangement a situation is achieved in which the vertical movements of the ischial tuberosities, which arise during tilting of the seat surface, mutually cancel so that the spine and thus the person sitting on the seat does not, in practice, experience any resultant vertical movement. This is particularly important when used as an office chair, because a vertical movement for example causes a changed arm support and is not desired.

In accordance with a further preferred embodiment of the invention the main axis extends in the region of the seat surface, in particular substantially within the seat surface. Through this positioning a position of the main axis is achieved which is as close as possible to the ischial tuberosities, whereby a lateral displacement of the pelvis during the tilting of the seat surface is avoided or reduced. The main axis can be arranged both beneath and also within or above the seat surface. With an arrangement of the main axis above the seat surface this is an imaginary main axis, which is, for example, achievable by journaling the tiltable part of the seat surface on a spring design, which brings about a tilting about the imaginary main axis arranged above the seat surface. The tilting can, for example, also be achieved by a pneumatic or by a hydraulic arrangement instead of by a spring construction. When tilting takes place about an imaginary axis, this can naturally also be arranged beneath or above the seat surface.

Accordingly, it is not decisive whether the main axis is physically formed but rather that the tiltable part of the seat surface executes a tilt movement about a main axis, whose real or imaginary position can be located at the same height as the ischial tuberosities of a person sitting on the seat element.

In accordance with a further advantageous embodiment of the invention the tiltable part of the seat surface is basically freely tiltable between the maximum tilting angles, i.e. tiltable without notable resistance. In this way a situation is achieved in which through the sitting person himself the pelvis and thus also the lumbar spine is continuously subject to slight movements so that a rigid sitting position can be avoided.

In accordance with a further preferred embodiment of the invention the tilting movement can be controlled by means of a drive unit, so that a passive movement of the pelvis and thus also of the lumbar spine of a person sitting on the seat element is achieved. In this way certain patterns of movement can be predetermined, which are physiologically ideally adjusted to the needs of the spine. Furthermore, various patterns of movement can be used for different fields of application.

The drive unit can preferably be switched off so that in cases where a movement of the seat surface is not desired the drive unit can be switched off. In this respect the drive unit can be switched off both manually and also automatically.

In a further preferred embodiment of the invention the drive unit is connected to a control unit by means of which the patterns of movement of the tiltable part of the seat surface can be switched on and off. These patterns of movement can be predetermined and in particular repeat themselves periodically. However, purely randomly generated patterns of movement can also be produced in order to counteract an accustomization effect, for example.

In accordance with a further advantageous embodiment of the invention the drive unit is connected to a control means by which the drive unit can be switched on and off at specific time intervals. In this way it is possible, on the one hand, to realize a specific pattern of movement and, on the other hand, to prevent an overstimulation of the person sitting on the seat. Since the therapeutic effect of a stimulation normally reduces if the stimulation persists, it is thus desirable to stop the drive unit for a certain time range.

The time intervals are thereby preferably adjustable so that they can be ideally matched to the particular use, and in particular to the person and/or to the use in a motor vehicle or as an office chair or the like.

In accordance with a further advantageous embodiment, the control means is connected to sensor elements and the drive unit can be switched on and off in dependence on the signals delivered by the sensor elements. In this respect a situation is achieved, for example with a seat in a motor vehicle, in which the drive unit, and thus a tilting of the seat surface, can be switched on or off in dependence on the respective traffic situation. For example, switching off of the tilting movement of the seat surface can be sensible in certain situations of danger, because the tilting can bring about an additional irritation of the driver.

The sensor elements preferably include acceleration sensors so that the drive unit can be switched off on exceeding a predetermined acceleration value. In this way one can, for example, avoid a situation in which, when traveling around a bend with excessive speed, the seat surface tilts away laterally towards the outside, which could lead to an irritation of the driver and thus to an accident.

In accordance with a further advantageous embodiment of the invention the tiltable part of the seat surface can be fixed in at least one position, in particular in different positions. In this way a situation is achieved in which the seat can be set into a comfortable position, should at one time no mobility of the seat surface be desired.

In accordance with a preferred embodiment of the invention the tiltable part of the seat surface is tiltable about a plurality of axes, which extend substantially in one plane and intersect at one point of rotation. In this way it is not only possible to achieve a lateral tilting movement of the seat surface but rather a tilting movement of the seat surface to the front and to the rear and into any desired direction lying there between. In this manner complex patterns of movement of the pelvis and thus of the lumbar spine can be carried out both with a passive movement of the seat surface and also with an active movement of the seat surface and enable an even better supply of the spine. Furthermore, the rear pelvic presentation can be prevented by the tilting towards the front, so that a lordotic adjustment of the lumbar spine is achieved in the front and middle pelvic position.

The point of rotation at which the axes intersect is preferably arranged beneath the ischial tuberosities of a person using the seat element. This embodiment particularly contributes to avoiding a front or rear pelvic position which can, for example with a round back, lead to a higher inner pressure of the intervertebral discs and thus to dull fatigue pains. In order to take account of different physical features of the persons using the seat element of the invention, and in particular to ensure that the point of rotation always lies beneath the ischial tuberosities, the distance between the point of rotation and the backrest attached to the seat element or a rear support for the crest of the ilium can be adjustable. The adjustment is achieved either by adjusting the point of rotation itself or by an adjustment of the backrest or of the rear support for the crest of the ilium. Through this possibility of adjustment the seat element of the invention can be adapted to any user. In particular it is possible to ensure through the possibility of adjustment, that the point of rotation is always located directly beneath the ischial tuberosities.

Through the described embodiment a situation is, moreover, achieved in which the pelvic frame of the seat element can be adapted in a particularly favorable manner to the anatomic circumstances of the particular user. A disadvantage of reduced mobility associated with an improved adaptation to the framing of the pelvis, is balanced out by the mobility of the seat element in accordance with the invention.

Through the restriction of the tilting movement to the rear in accordance with the invention it is possible to largely avoid the rear pelvic presentation, in particular in combination with an optimized framing of the pelvis (for example, support of the crest of the ilium, sacral truss pad, improved tuber framing, good buttock and thigh muscle framing). The tiltability towards the front enables the front pelvic presentation in particularly good manner and thus favors desk activities.

The maximum tilt angle for different axes, in particular for the positive and for the negative direction of tilting, is preferably different. The different maximum tilt angles are in this respect preferably separately adjustable, so that the maximum movement of the lumbar spine in all directions can be restricted for each person to a physiologically ideal value.

The maximum lateral tilt angle can preferably adopt a value between 0° and ±15° relative to the central position of the tiltable part of the seat surface. In accordance with an expedient embodiment of the invention, the maximum lateral tilt angle amounts to between ±3° and ±13°, in particular to between ±7° and ±12°, preferably to between ±9° and ±11°. Depending on the mobility of the spine of the person sitting on the seat element, a different, ideal maximum lateral tilt angle can be set.

For the tilting movement to the front, the maximum tilt angle relative to the central position of the tiltable part of the seat surface can adopt any value between 0° and 30°, in particular between 5° and 25° and preferably between 10° and 20°, and especially preferably between 13° and 17°. For the tilting movement to the rear, the maximum tilting angle relative to the central position of the tiltable part of the seat surface can adopt any value between 0° and 15°, in particular between 3° and 13° and preferably between 7° and 12°, and especially preferably between 9° and 11°.

In accordance with a further advantageous embodiment of the invention the main axis and/or the further axes are arranged at a maximum of 8 cm, in particular at a maximum of 6 cm and preferably at a maximum of 4 cm and especially at a maximum of 2 cm from the seat surface. The closer the axes are arranged to the seat surface or to the ischial tuberosities of a person sitting on the seat the smaller are the lateral translational movements of the pelvis or the translational movements to the front and the rear, which arise with a tilting movement of the seat surface. Thus an arrangement of the main axis and also of the further axes as close as possible to the level of the ischial tuberosities is to be preferred.

In certain cases it can, however, be advantageous to consciously generate translational movements of the pelvis during the tilting movements to the front or the rear. For example, with an office chair, a displacement of the pelvis to the front can be desired during tilting, since in this manner the front to center pelvic presentation is automatically set. Furthermore, with a motor vehicle seat a displacement of the pelvis to the rear can be desired during tilting of the seat surface, since in this way an additional pressing against the backrest or a possibly present lordosic support or sacral support takes place, so that an improved pelvic framing can be achieved. In these cases an arrangement of the axis for the tilting movement to the front or the rear can be selected, which is substantially beneath or above the level of the ischial tuberosities.

In accordance with a further expedient embodiment of the invention, a backrest is provided at the rear edge of the seat surface. A backrest of this kind is essential, in particular when using a seat element designed in accordance with the invention in a motor vehicle. However, even when using it as an office chair or as a recreational chair, an additional support of the spine is achieved by a backrest, in particular when the backrest is equipped with a lordosic support and/or a sacral support. It is, however, basically also possible to design the seat element formed in accordance with the invention as a seat cushion without backrest. In this manner a compact design of the seat element of the invention is possible, whereby transport is in particular simplified and the manufacturing costs are reduced.

In this respect it is advantageous for the point of rotation to be arranged between 5 and 30 cm, in particular between 8 cm and 20 cm and preferably between 11 cm and 16 cm from the rear edge of the seat surface or from the backrest. In this way a situation is achieved in which the point of rotation is arranged in the region directly beneath the ischial tuberosities of a person sitting on the seat element, since as a statistical average, the ischial tuberosities are spaced by 13.5 cm from the rear end of the support surface or from the dorsal restriction of the seat surface. Only with a positioning of the point of rotation above the ischial tuberosities is a vertical movement of the pelvis to the front or rear avoided during tilting of the seat surface.

In connection with a desired displacement of the pelvis to the front or the rear, the axis of rotation for the tilting movement to the front and the rear can also be arranged further from the backrest or from the rear edge of the seat surface, or can be arranged closer to these.

In accordance with a further preferred embodiment of the invention the drive unit includes a hydraulic arrangement, with this hydraulic arrangement including a control unit and in particular hydraulically actuatable elements which are connected to the tiltable part of the seat surface and can be controlled by the control unit to tilt the tiltable part of the seat surface. In this manner a passive movement of the seat surface and thus of the pelvis and of the spine of a person sitting on the seat element can be realized. As a result of the hydraulically actuatable elements, which are in particular pivotably connected in the region of the edges of the tiltable part of the seat surface, a tilting movement of the tiltably part about a plurality of imaginary axes, i.e. about an imaginary point of rotation, is possible. Should only a lateral tilting of the tiltable part of the seat surface be possible, then one or two hydraulically actuatable elements are adequate. Should in contrast tilting movements be possible about a plurality of tilting axes, then three or more hydraulically actuatable elements are necessary.

In accordance with a further advantageous embodiment, a ball joint is provided at the point of rotation. In this way a seat surface tiltable in all directions can be realized at a very favorable price. Depending on whether a drive unit is additionally provided, a simple and cost favorable design of a passively or actively movable seat surface is possible.

In accordance with a further advantageous embodiment, a ball segment or an ovaloid segment is arranged between the tiltable part of the seat surface and the base unit, with the tiltable part of the seat surface, which is in particular formed as a substantially flat plate, being tiltably journaled on the ball segment or ovaloid segment. In this manner a particularly simple and cost favorable design of a seat element in accordance with the invention is possible and, when using an ovaloid segment, different radii of tilting can be achieved in different directions as a result of the differential tilting diameter.

The tilting radius for the tilting movement to the front or rear is thereby preferably smaller than the tilting radius for the lateral tilting movement, and the tilting radius for the tilting movement to the front is smaller than the tilting radius for the tilting movement to the rear.

With a tilting of the plate the contact point between the plate and the ovaloid, i.e. the point of rotation of the tilting movement, migrates on the surface of the ovaloid. During this the point of rotation moves during a tilting movement along a smaller tilting radius more rapidly downwardly than with a tilting movement along a large tilting radius. In this manner a vertical displacement of the point of rotation can be selected independently of the tilting direction, which leads to an enlargement of the spacing between the point of rotation and the seat surface, and thus to a horizontal displacement of the pelvis. A horizontal displacement of this kind to the front can, in particular, be desirable for an office chair, a horizontal displacement to the rear can be desirable for a motor vehicle seat.

Thus, the present invention provides a seat element that adjusts the saddle of the seat to pelvic movements during, for example, cycling. Such a saddle allows a free bending of the pelvis toward the left and the right and thereby allows a movement between the spine and the pelvis to reduce the static workforce of the paraspinal muscles to reduce stiffness, fatigue and pain of the lower back. Additionally, the present invention limits the amount of degrees the pelvis is tilted sideways in order to avoid the feeling of instability. Preliminary studies of a seat element in accordance with the present invention have indicated a deceased fiction of the ischial tubourositites observed by several cyclists. Furthermore, stiffness of the lower back was also significantly reduced. Accordingly, the present invention provides a seat element that decreases the seat friction of the ischial tuberosities during cycling and decreases, or even avoids, the occurrence of buttock pain and skin ulceration.

DESCRIPTION OF THE PREFERRED EXEMPLARY EMBODIMENTS

Figure 1:
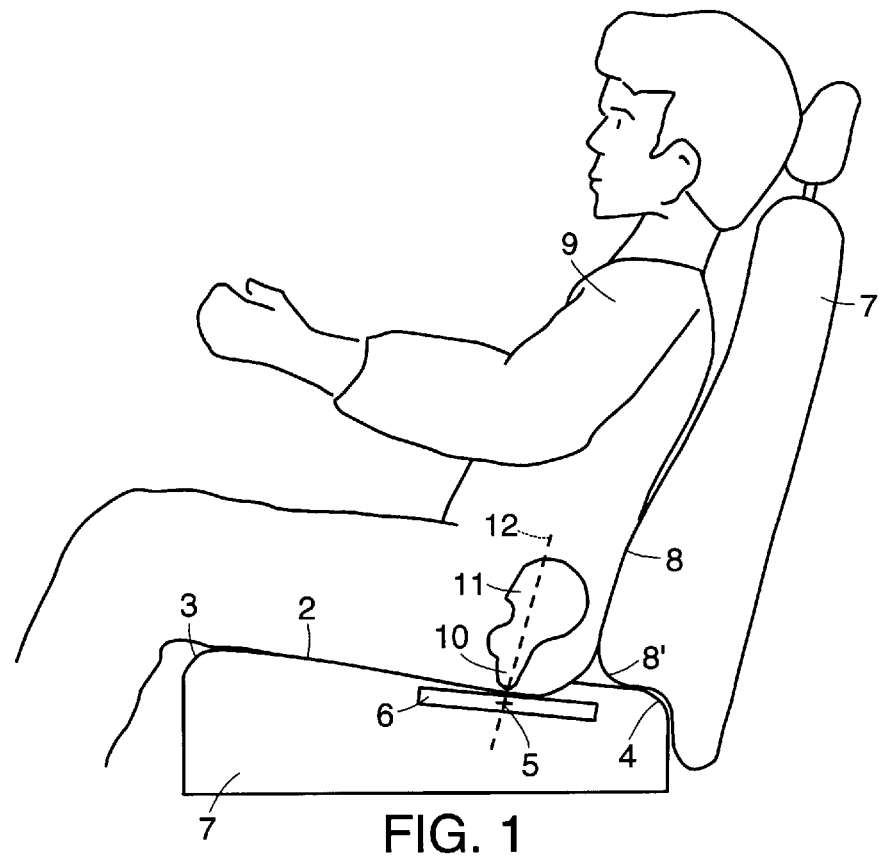
FIG. 1 is a side view of a motor vehicle seat formed in accordance with the invention with a schematic illustration of the tiltable part of the seat surface and of the pelvis of a person sitting on the seat.

FIG. 1 shows a motor vehicle seat having a base unit 1 and a seat surface 2 which has a front edge 3 and a rear edge 4. The seat surface 2 includes a plate 6 which is tiltably journaled between the front edge 3 and the rear edge 4 about an axis 5.

The motor vehicle seat furthermore comprises a backrest 7 which is arranged in the region of the rear edge 4 of the seat surface 2 and has a lordosis support 8 and also a sacral support 8' at its front side.

Figure 2:
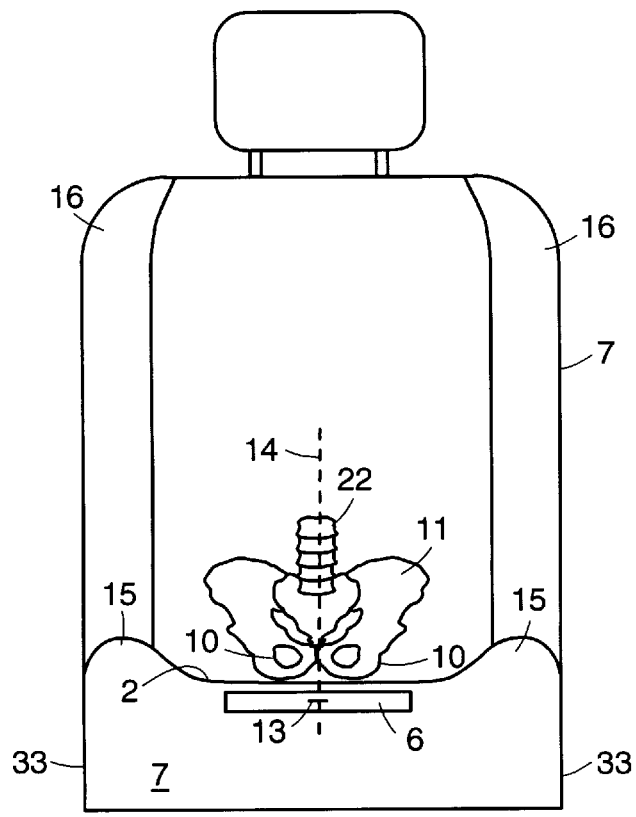
FIG. 2 is a front view of the motor vehicle seat of FIG. 1, wherein only the pelvis and the lower region of the spine of the person illustrated in FIG. 1 are shown.

A person 9 is arranged sitting on the seat and is shown in a typical driving position. The plate 6 is positioned with the axis 5 within the seat surface 2 in such a way that the axis 5 is arranged directly beneath the ischial tuberosities 10 of the pelvis 11 of the person 9. Furthermore, a line 12 is drawn in broken lines in FIG. 1, which shows the position of the pelvis 11 in the central position of the plate 6 shown in FIG. 1 with respect to a tilting movement to the front or to the rear about the axis 5. In the front view of the seat of FIG. 1, as shown in FIG. 2, it can be seen that the plate 6 is also tiltable about a main axis 13 in addition to the axis 5, with the main axis being centrally arranged between the side edges 33 of the seat. A lateral tilting of the pelvis 11 is possible about this main axis 13, while a tilting of the pelvis 11 to the front or the rear takes place about the axis 5 shown in FIG. 1.

A line 14 is drawn in in FIG. 2 in correspondence with line 12 of FIG. 1 and shows the position of the pelvis 11 in the central position shown in FIG. 2 with respect to the lateral tilting about the main axis 13. In this central position the lumbar spine 22 of the person 9 has essentially no lateral bending deflection.

It can, furthermore, be seen from FIG. 2 that both the seat surface 2 and also the backrest 7 include support elements 15, 16 in the form of material reinforcements, which ensure a lateral support of the person 9.

Figure 3:
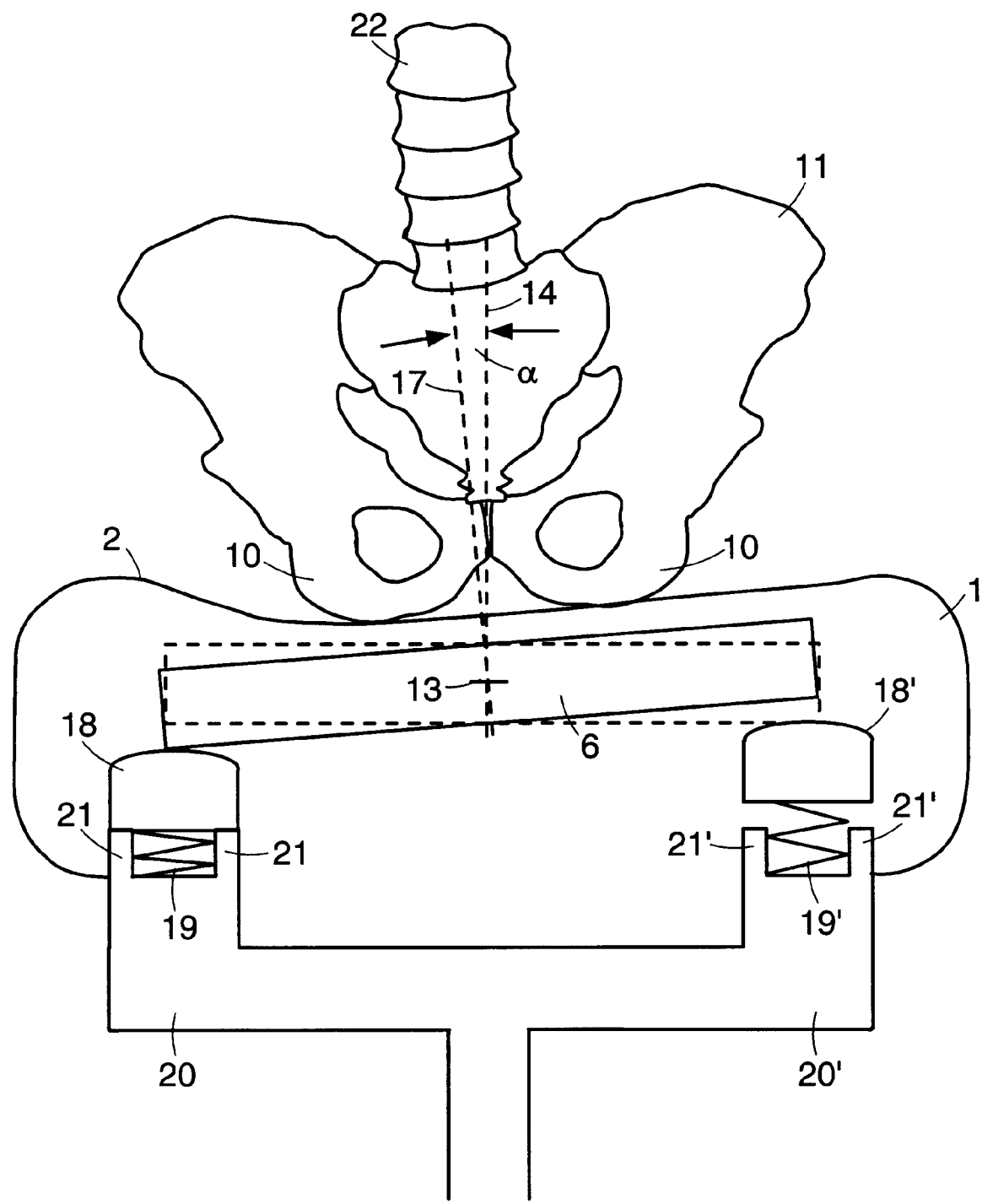
FIG. 3 is a front view of a bicycle seat in which the pelvis is tilted laterally relative to a central position shown in broken lines.

In the front view of a bicycle seat in accordance with FIG. 3 the pelvis 11 is shown tilted laterally relative to the line 14 characterizing the central position. The tilted position of the pelvis 11 is characterized by a chain dotted line 17, so that the tilt angle α corresponds to the angle enclosed by the lines 14 and 17.

The plate 6 is also shown tilted about the main axis 13 through the angle (x relative to its middle position shown in broken lines. The left side of the plate 6 lies on a buffer element 18, which is supported in damped manner via a spring 19 on a carrier or support element 20. The carrier element 20 has two abutments 21, against which the buffer element 18 comes into contact when the spring 19 is compressed, as shown in the left hand half of FIG. 3, so that the angle α shown in FIG. 3 corresponds to the maximum lateral tilt angle.

In the right hand half of FIG. 3 there are shown a corresponding buffer element 18', a spring 19' and also a carrier element 20' with abutments 21', which serve to restrict the tilting of the plate 6 during a lateral tilting movement in the clockwise sense.

As can be seen from FIG. 3, the lumbar spine 22 is curved by the tilting of the pelvis 11, so that the corresponding intervertebral discs are supplied with nutrients.

Figure 4:
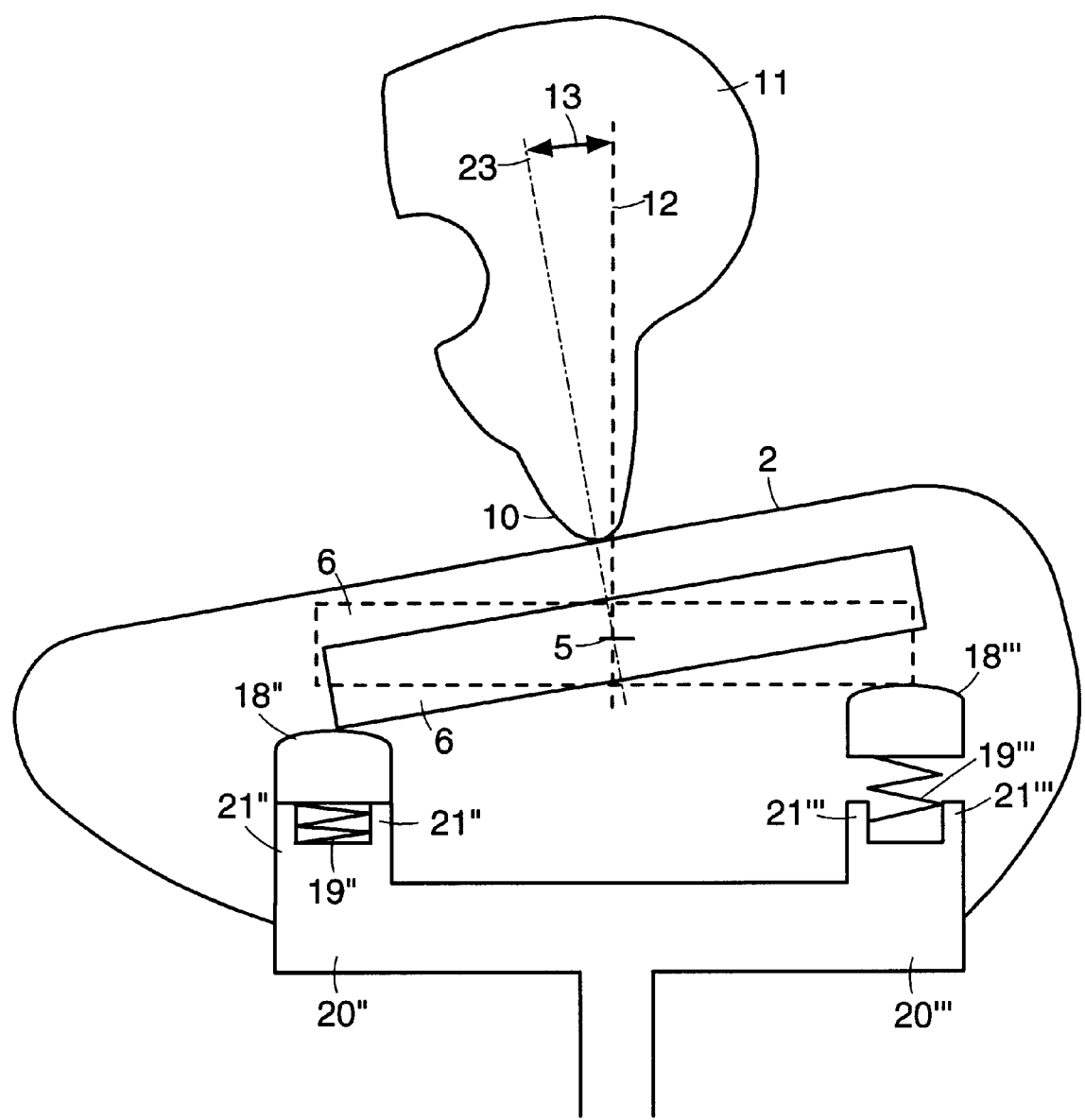
FIG. 4 is a side view of the bicycle seat of FIG. 3, with the pelvis being shown tilted to the front relative to a central position shown in broken lines.

In FIG. 4 the plate 6 is tilted relative to a central position shown in broken lines by an angle β towards the front. In corresponding manner the pelvis 11 is also tilted to the front by an angle P relative to the central position, with the position of the pelvis being shown by the chain dotted line 23.

As in FIG. 3, elements are also provided in FIG. 4 to restrict the maximum tilt angle and include buffer elements 18", 18''', springs 19", 19''' and also carrier elements 20", 20''' with abutments 21", 21'''.

Figure 10A:
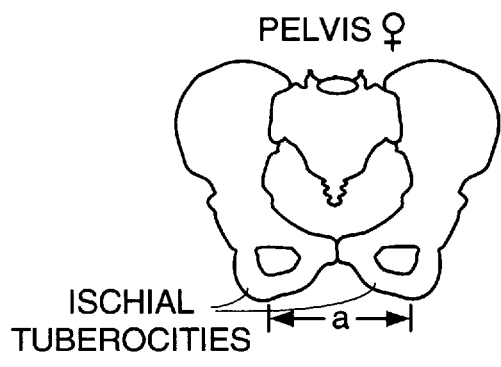
FIGS. 10A and 10B show the distance between the ishial tuberosities in an average female and in an average male, respectively.
Figure 10B:
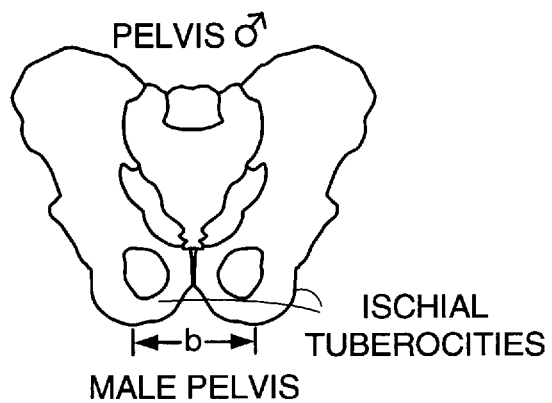

In accordance with one aspect of the present invention, the width of the bicycle seat is according to the anthropometric data of the distance of the ischial tuberosities. With reference to FIGS. 10A and B, it can be seen that the distance between the ischial tuberosities varies based upon gender. With reference to FIG. 10A, the distance a between the ischial tuberosities generally present in a female is generally on average 14 centimeters. With reference to FIG. 10B, the distance b between the ischial tuberosities within a male is generally on average 13 centimeters.

Figure 15B:
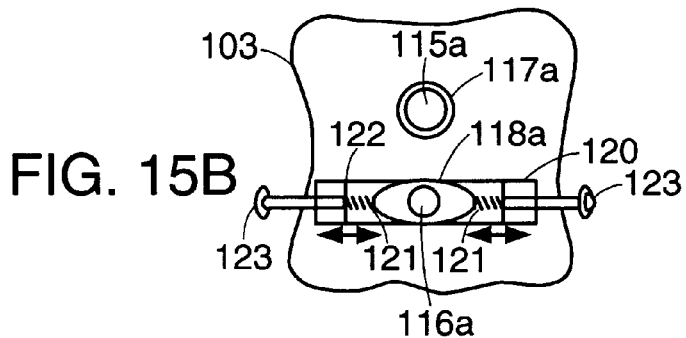
Figure 15A:
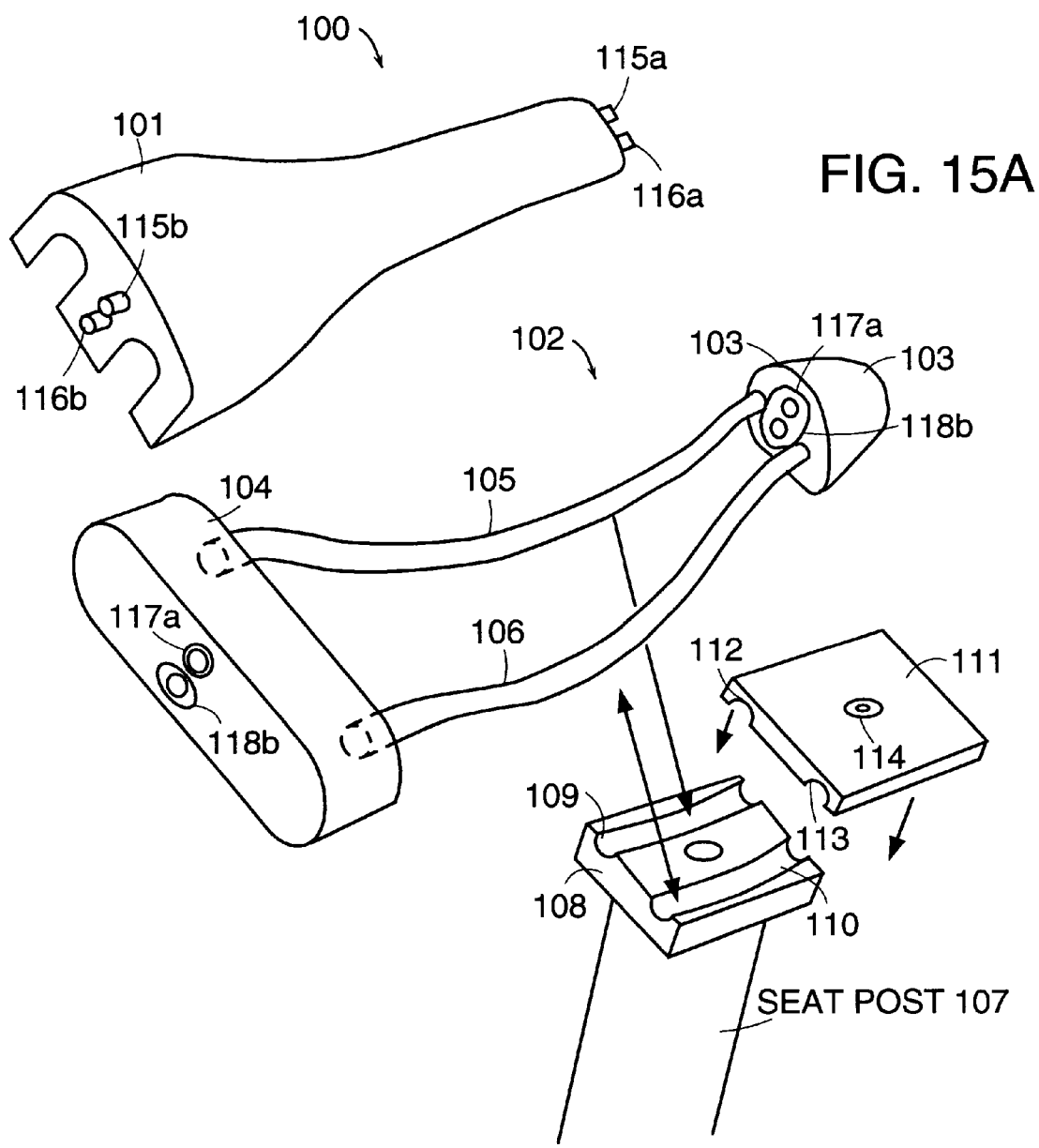
Figure 16:
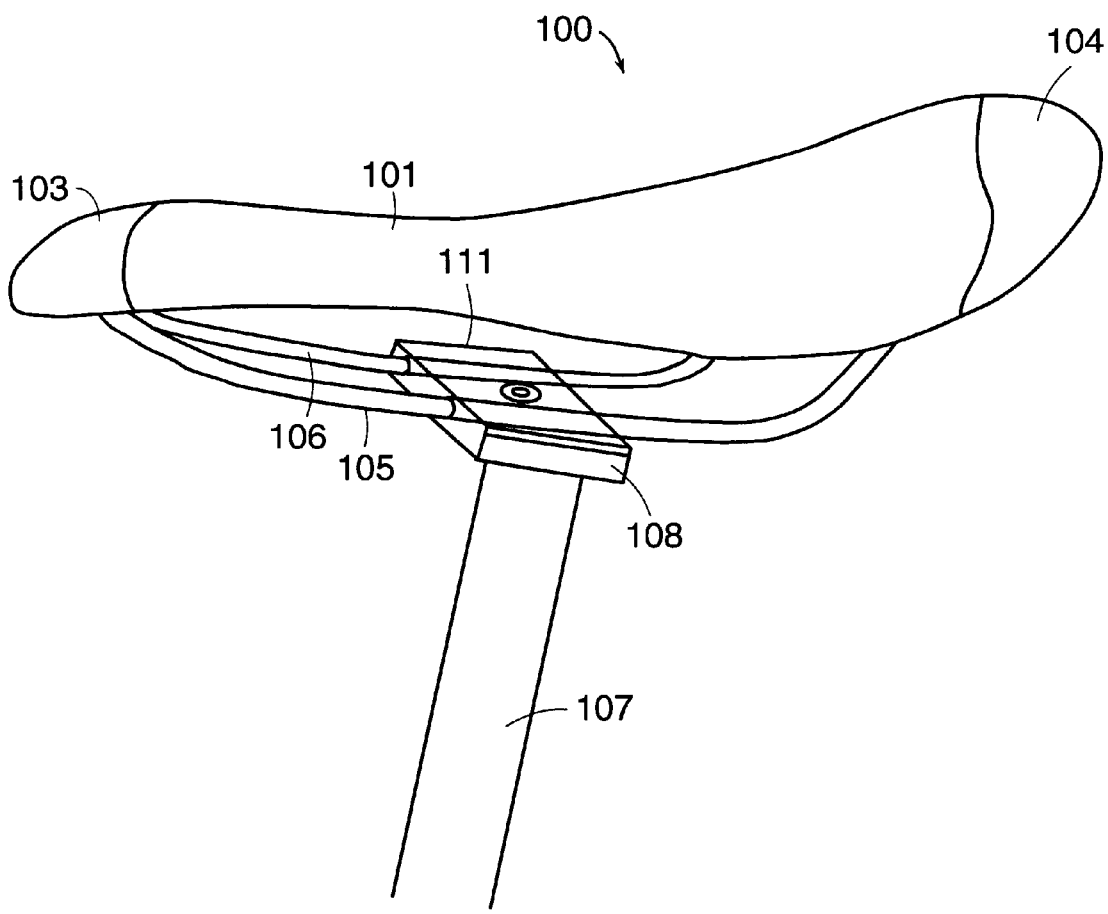

With reference to FIGS. 15A, B and 16, a bicycle seat 100 in accordance with one embodiment of the present invention is illustrated. Bicycle seat 100 essentially consists of two parts, specifically, a seating surface 101 and a seat basis 102. Seat basis 102 includes a front portion 103 and a rear portion 104 that are connected by two carrier bars 105, 106. Carrier bars 105, 106 are generally of a standard size that corresponds to general bicycle seats generally available and therefore, bicycle seat 100 may be connected to any commercially available seat post 107. For example, mounting platform 108 may be secured to seat post 107. Mounting platform 108 includes two grooves 109, 110 for, respectively receiving carrier bars 105, 106. Plate 111 is then secured over carrier bars 105, 106 via grooves 112, 113. Mounting plate 111 can then be attached to mounting platform 108 in a suitable manner, such as, for example, a screw 114.

Seating surface 101 functions as a tiltable part of bicycle seat 100. At each longitudinal end of seating surface 101 there is provided an upper projecting cylinder 115a, b and a lower projecting cylinder 116a, b, respectively. Front portion 103 and rear portion 104 both include an upper circular opening 117 for receiving the respective projecting cylinder 115 and a lower slit opening 118 for receiving the respective projecting cylinder 116.

When inserted between front portion 103 and rear portion 104, seating surface 101 may be tilted along the longitudinal axis extending through upper projecting cylinders 115. The maximum angle of this tilting movement is restricted by the lower slit openings 118 and the lower cylinder 116 projecting therein to preferably approximately ±3°.

The carrier bars 105, 106, as previously stated, generally correspond to bars that are well known and used in bicycle seats so that conventional fastening devices may be used for holding the bicycle seat as illustrated in the drawings.

With reference to FIG. 15B, the tilting system of the bicycle seat may be observed in detail. As can be seen cylinder 115A projects into opening 117A while cylinder 116A projects into cylinder 118A. Additionally, in accordance with one embodiment of the present invention, an adjustment system for adjusting the tilt angle is illustrated. This system includes a slot 120 within slot 118 is contained. Hence, in such an embodiment, slot 118 is preferably some type of tube or container that is capable of moving within slot 120. Springs 121 are mounted adjacent each side of slot 118 within slot 120. Partitions 122 are placed adjacent each spring and are engaged by screws 123. Hence, by using the screws to compress platforms 122, against springs 121, the amount of movement permitted for slot 118 within slot 120 may be varied, and hence, the degree of tile angle of the seat may be adjusted.

Figure 11A:
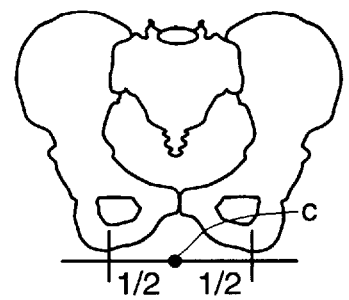
FIG. 11 illustrates a location for the axis about which the seat illustrated in FIGS. 15A and 15B may tilt.
Figure 11B:
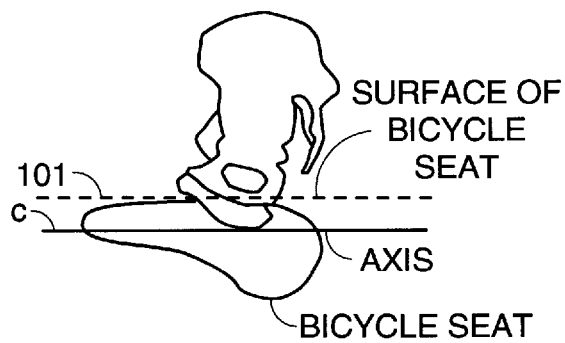
Figure 12:
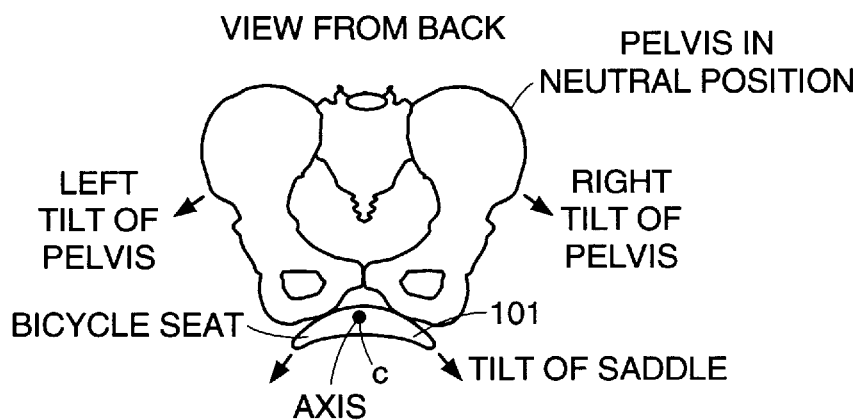
FIG. 12 illustrates the position of the ischial tuberosities relative to the seat illustrated in FIGS. 15A and 15B, FIGS. 13A and 13B illustrate the distance between the tilt axis and the seat surface of the seat illustrated in FIGS. 15A and 15B.

As may be seen in FIG. 11, the bicycle seat may tilt to the left and to the right along an axis C that runs parallel to the seat surface, and crosses the line between ischial tuberosities exactly in the middle and runs anteriorally parallel to the seat's surface. As can be seen in FIG. 12, the position of the axis is very important to accurately simulate the movement of the pelvis during cycling to the left and to the right.

Figure 13A:
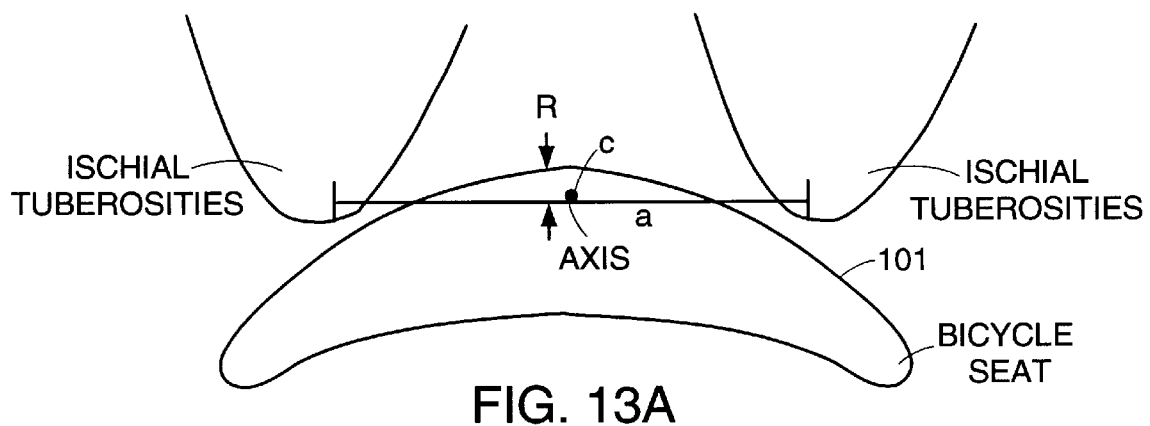
Figure 13B:
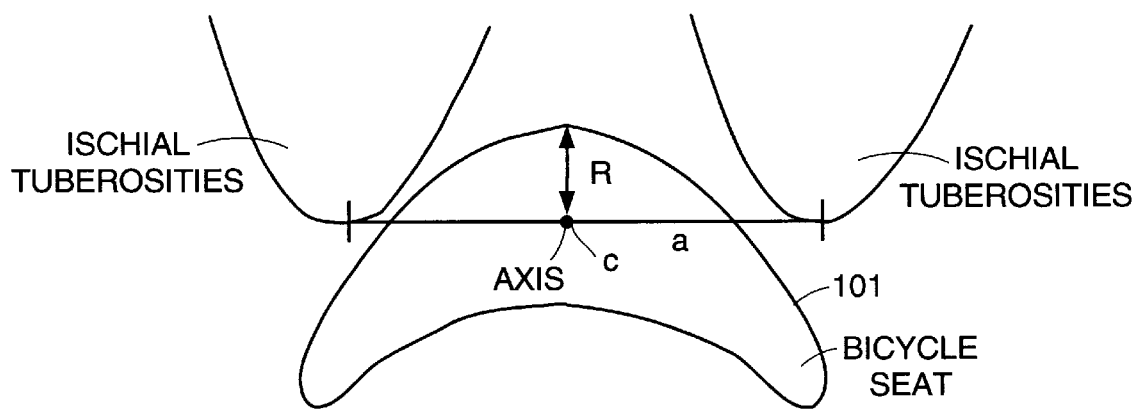

The distance of axis C to the seat surface depends on the distance of the ischial tuberosities and the curvature of the seat as may be seen in FIG. 13. If the radius R is large, (as illustrated in FIG. 13A), the distance to the seat surface would be smaller as opposed to when the radius R is small (as illustrated in FIG. 13B).

Figure 14:
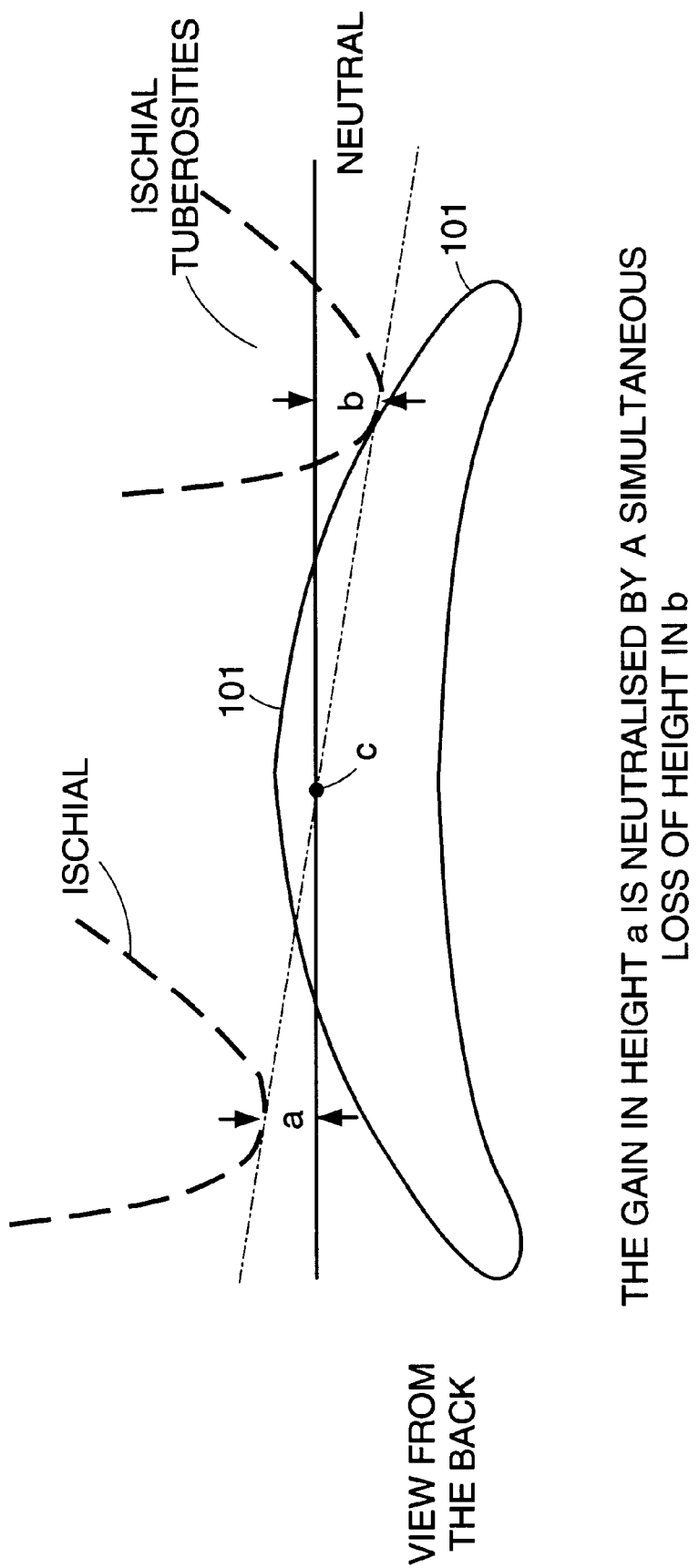
FIG. 14 illustrates the location of the ischial tuberosities relative to the tilt axis of the seat illustrated in FIGS. 15A and 15B, and FIGS. 15A, 15B, and 16 illustrate one embodiment of a bicycle seat constructed according to the invention.

A bicycle seat in accordance with the present invention does not allow transitional movements of the pelvis. The fixed axis C allows no change in vertical height, as may be seen in FIG. 14. If the axis stays exactly in the middle between both the ischial tuberosities, the left ischial tuberosity will be raised a distance b as the right ischial tuberosity is lowered by exactly the same amount distance a, thus allowing no vertical change in height.

Preferably, the tilt of the bicycle seat is no more than 15° to each side, and most preferably it is 3° to each side thereby avoiding an instable impression of the seat.

Thus, a bicycle seat in accordance with the present invention avoids the use of springs which thereby allows the saddle to follow the pelvic movements without friction. Since the saddle follows the pelvic movements, a more anatomic padding may be applied to a bicycle seat in order to improve the comfort of the bicycle seat. Additionally, since the saddle follows the pelvic movements, the static muscle work between the pelvis and the lumbar spine is reduced and therefore, lower back pain is reduced.

The bicycle seat in accordance with the present invention avoids the use of springs which are of limited use in mountain and road bicycle sets. Springs generally take up too much space and are therefore preferably used for recreational bicycles. Furthermore, prior art seats, especially those that include springs, include seating surfaces that are generally too large to meet the requirements of high demanding sportive mountain and road bicyclists.

Figure 5:
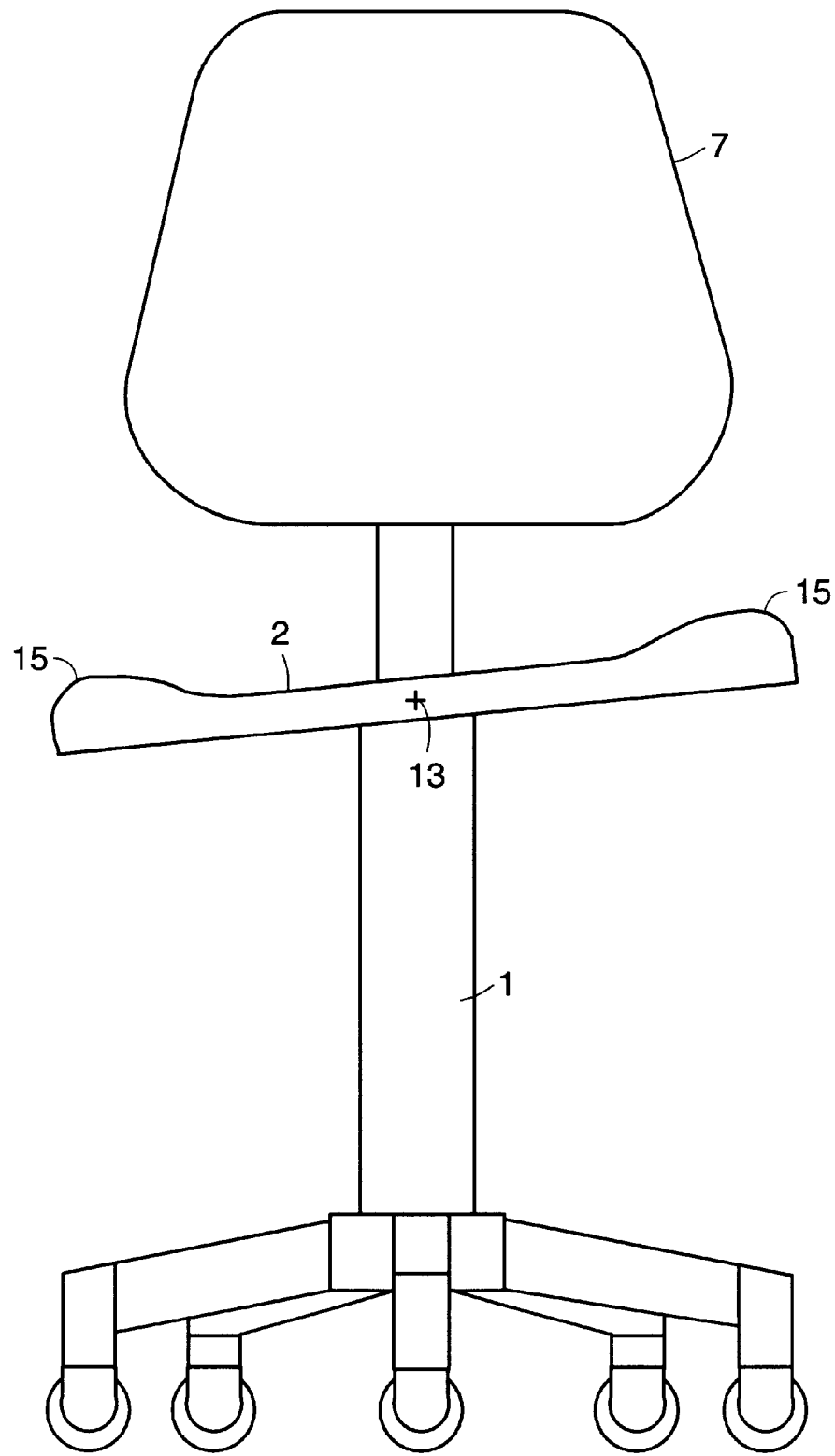
FIG. 5 is a further embodiment of a seat element formed in accordance with the invention.

In FIG. 5 there is shown a seat element formed in accordance with the invention in the form of an office stool. In this office stool not only a part of the seat surface but rather the entire seat surface 2 is tiltable about the main axis 13, in contrast to the embodiment of FIGS. 1 to 4.

Figure 6:
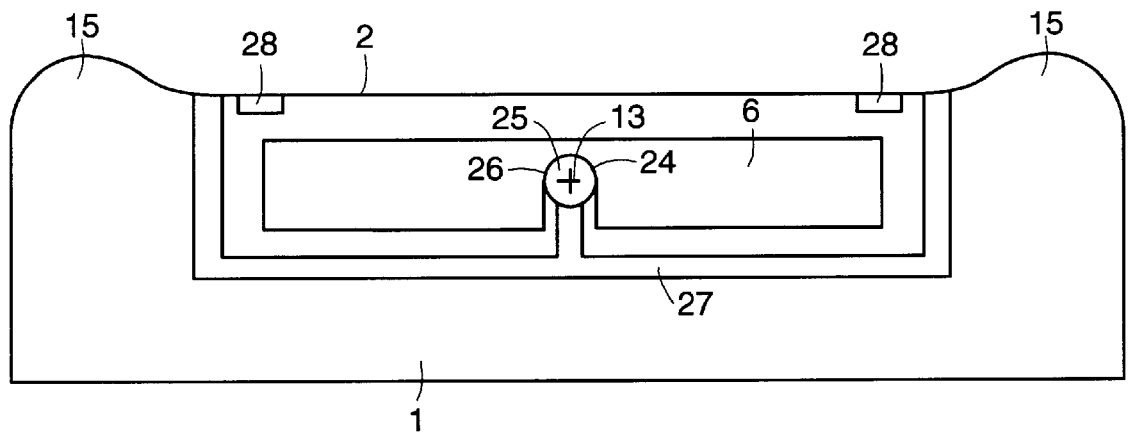
FIG. 6 is a schematic illustration of a first variant of a support in accordance with the invention for the tiltable part of the seat surface.

FIG. 6 shows a special support of the plate 6 of a seat element formed in accordance with the invention. The plate 6 contains a recess 24 with a substantially U-shaped cross section, which forms a ball joint 26 together with a ball 25 inserted into the recess 24.

The ball 25 is connected to the seat surface 2 via a holder 27. In this way the spacing between the upper side of the seat surface 2 and the ball joint 26 remain substantially constant with a movement of the seat surface 2 downwardly under the weight of a person sitting on the seat, since the ball joint 26 moves downwardly together with the seat surface 2.

Figure 7:
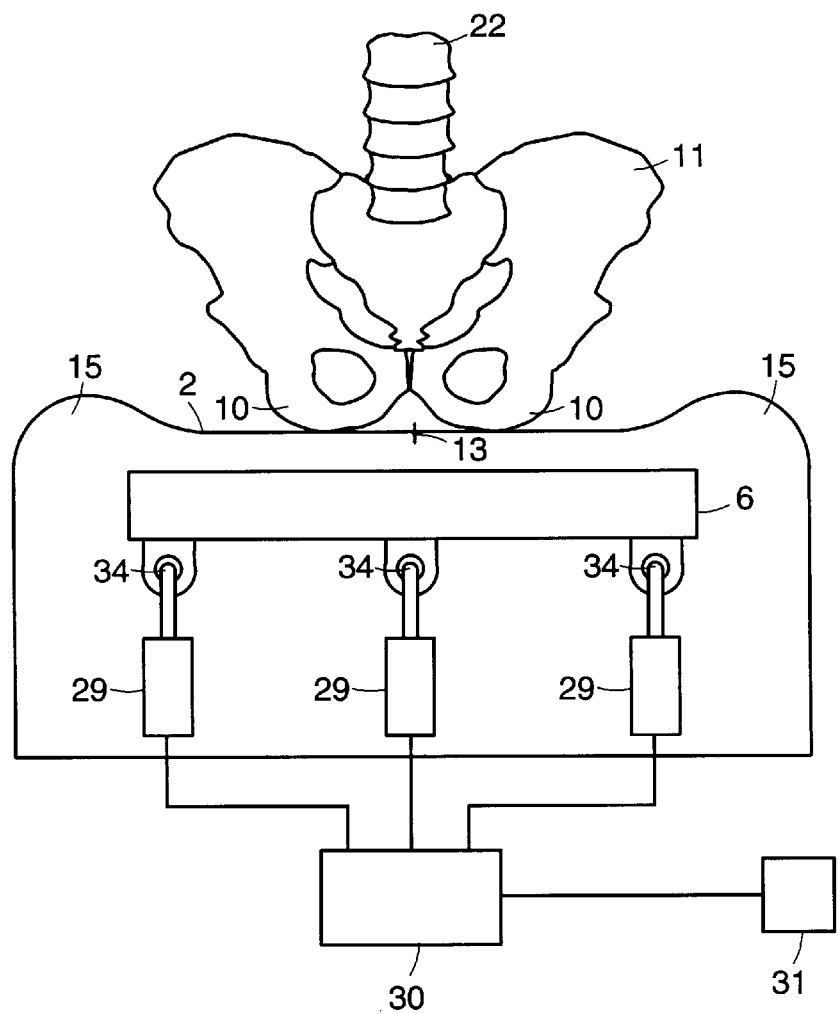
FIG. 7 is a schematic illustration of a second variant of the support in accordance with the invention of the tiltable part of the seat surface.

Furthermore, two restriction elements 28 are provided at the seat surface 2 which restrict the maximum tilt angle of the plate 6. Through the arrangement of the restriction elements 28 at the seat surface 2 it is ensured that the maximum tilt angle remains unchanged with a movement of seat surface 2 downwardly. With the support of the plate 6 in accordance with the invention as shown in FIG. 7 the plate is connected via joints 34 to hydraulically controllable telescope elements 29 at three positions. The hydraulically controllable telescope elements 29 are controllable via a control unit 30, which is connected to a sensor element 31.

The plate 6 can be moved via the control unit 30 and the telescope elements 29 so that tilting movements can be realized about an imaginary main axis 13. Imaginary main axis 13 is thereby arranged at the top side of the seat surface 2 at the level of the ischial tuberosities 10 vertically beneath the lumbar spine 22.

Figure 8:
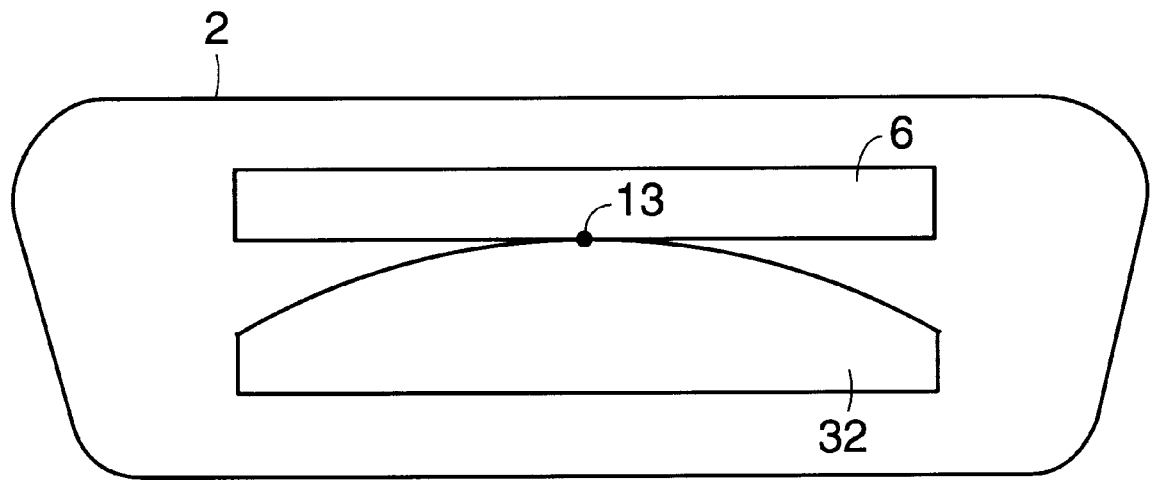
FIG. 8 is a schematic illustration of a third variant of a support formed in accordance with the invention for the tiltable part of the seat surface as seen in a front view.
Figure 9:
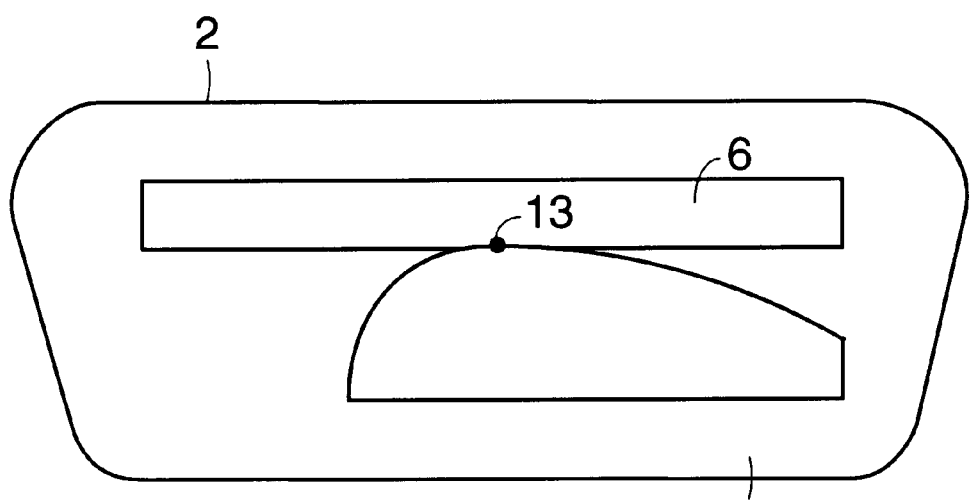
FIG. 9 is the support of FIG. 8 designed in accordance with the invention as seen in a side view.

In the embodiment of the invention shown in FIGS. 8 and 9 the plate 6 is tiltably journaled in the convex surface of an ovaloid segment 32. In this respect FIG. 8 shows the front view from which it can be recognized that the tilting radii are selected to be the same for the lateral tilting. In this way the lateral tilting movements in the two directions are possible to a small restricted extent, which is, however, the same. Furthermore, it can be seen that the tilting radius for the lateral tilting is large in comparison to the tilting radius for the tilting movement to the front or to the rear (FIG. 9). In this way account is taken of different extents of movement of the distal lumbar spine to the side and also to the front or rear.

FIG. 9 shows the side view of the embodiment of FIG. 8. Since the tilting radius for the tilting movement to the front (shown to the left in FIG. 9) is smaller than the tilting radius for the tilting movement to the rear (shown at the right in FIG. 9) larger tilting movements are possible to the front than to the rear. Thus the differential extents of movement of the distal lumbar spine to the front and to the rear are taken into account.

In the following the manner of operation of a seat element formed in accordance with the invention and also the method of the invention for the control of such a seat element will be described in more detail.

Through the double support of the plate 6 both about the axis 5 and also about the main axis 13 the point of intersection of the axes 5 and 13 forms a point of rotation for the plate 6 so that the latter is tiltable about this point of rotation in any desired direction.

The position of the point of rotation is so selected that it is arranged, on the one hand, exactly vertically beneath the ischial tuberosities 10 with respect to the side view of FIG. 1 and, on the other hand, is arranged with respect to the front view of FIG. 2 at the center between the side edges 33 of the seat surface and thus lies essentially centrally between the ischial tuberosities 10. Moreover, the point of rotation lies as close as possible to the upper side of the seat surface 2 and thus almost at the level of the ischial tuberosities 10, so that both lateral tilting and also a tilting of the plate 6 to the front or to the rear brings about almost exclusively only a lateral tilting of the pelvis 11 or a tilting of the pelvis 11 to the front or to the rear, without a translational movement of the pelvis 11 taking place.

Since the plate 6 is substantially freely tiltable about the point of rotation 5, 13, the pelvis 11 continuously executes the small tilting movements, whereby the lumbar spine 22 is slightly curved both sideways and also to the front and the rear, as can be seen from FIG. 3. The tilting movements are thereby so small that the curvature of the lower lumbar spine is compensated for by an opposite movement of the upper lumbar spine, so that the thoracic spine is practically not curved. In this way the stability of the seated position is maintained, which is in particular important when using the motor vehicle seat.

Through the continuous movement of the pelvis 11 and of the lumbar spine 22 a supply of the elements of the spine is ensured, on the one hand, and cramps, strains and stiffness due to sitting in a rigid position are avoided, on the other hand.

In this respect it is important that the maximum tilt angles α and β of the plate 6 and thus of the pelvis 11 are restricted by the buffer elements 18 so that an overextension is prevented. As can be seen from FIGS. 3 and 4, the free ends of the plate 6 enter into contact with the buffer element 18–18''' during tilting and these are pressed by the further tilting against the spring force of the springs 19–19''' until they come into contact with the abutments 21–21''' of the carrying elements 20–20'''. In this manner the maximum tilting movements of the plate 6 are effectively restricted.

In this respect it is advantageous when the maximum tilt angles α and β are, for example, individually adjustable by adjustability of the buffer elements 18–18''' for the person sitting on the seat, since in this manner ideal tilting angles α and β can be selected in dependence on the respective physiological characteristics of the person. The restriction elements can in this respect be so set that the maximum tilting angles for the front, for the rear, to the left and to the right have different values in order to enable an even more precise adjustment to the particular person.

In place of an active movement through the person sitting on the seat the tiltable part 6 of the seat surface 2 or the entire seat surface 2 can also be moved by a drive unit 30 as is, for example, shown in FIG. 7. In this manner a tilting of the plate 6 about the imaginary point of rotation 13 can be achieved, for example by the hydraulic telescopic elements 27 illustrated in FIG. 7. Since the point of rotation 13 is not in this case tied to the position of a plate 6, but can rather be placed in any desired position by a corresponding control of the hydraulic telescope elements 29, the ideal positioning of this point of rotation 13 at the center between the ischial tuberosities 10 and at the level of the ischial tuberosities 10 is possible in this manner.

Furthermore, predetermined patterns of movement can be transferred to the plate 6 by the drive unit 30 which bring about an ideal physiological movement of the pelvis 11 and of the spine 22.

By way of example, retardation values of a motor vehicle can be recorded by the sensor element 31 so that the control unit 30 stops the motion of the plate 6, for example, when traveling around bends at high speed, in order to prevent an irritation of the driver.

Furthermore, during an emergency stop detected by the sensor element 31, the plate 6 can be tipped upwardly at its front edge so that the front edge of the seat surface 2 is moved upwardly so that the sliding of the person sitting on the seat through or under the safety belt is counteracted. It can basically also be sensible for the tiltable part of the seat surface to be tilted in the opposite direction to the centrifugal force on exceeding specific acceleration values.

In the embodiment of FIGS. 8 and 9 the point of rotation 13 moves during the tilting movement of the plate 6 along the surface of the ovaloid segment 32. In this respect, in particular during a tilting movement to the front (to the left in FIG. 9), a relatively pronounced vertical shift of the point of rotation 13 takes place downwardly, which in addition to tilting the pelvis also brings about a shift to the front. In this way, the automatic setting of the front or at least the central pelvic presentation can be achieved, for example with an office chair.

What is claimed is:

1. A seat element comprising a base unit, a seat surface portion, and a restriction element, the seat surface portion having a front edge and a rear edge, the seat surface portion being permitted to tilt about a main axis within a range with respect to the base unit, the seat surface portion being prevented from tilting beyond the range, the main axis extending from the front edge to the rear edge, the range being at most plus or minus five degrees relative to a central position of the seat surface portion, the seat surface portion tilting within the range without restriction in response to external pressure applied to the seat surface portion, the restriction element selectively reducing the range to less than plus or minus five degrees.

2. A system according to claim 1, the base unit further including two carrier bars.

3. A system according to claim 1, the restriction element comprising a screw for adjusting a size of the second aperture.

4. A system according to claim 1, wherein the range is no more than plus or minus three degrees away from the central location.

5. A seat element in accordance with claim 1 wherein the amounts of the maximum tilt angle in a positive direction of tilting and in a negative direction of tilting are of the same size.

6. A seat element in accordance with claim 1 wherein the amounts of the maximum tilt angle in the positive direction of tilting and in the negative direction of tilting are of different sizes.

7. A seat element in accordance with claim 1 wherein the main axis extends substantially at the center between side edges of the seat surface portion.

8. A seat element in accordance with claim 1 wherein the main axis extends in the region of the seat surface portion.

9. A seat element in accordance with claim 1 wherein the main axis is arranged at a maximum spacing of ten centimeters from the seat surface.

10. A system for mounting a seat to a frame of a bicycle, comprising:

a base adapted for attachment to the frame, the base including a front portion and rear portion;

a seat including a front portion, a rear portion, and a seating surface, the rear portions of the seat and base being rotatably coupled together, the front portions of the seat and base being rotatably coupled together, the seat being locatable in a central location with respect to the base, the couplings between the front and rear portions permitting the seat to tilt within a range relative to the base, the seat being prevented from tilting beyond the range, the range being no more than plus or minus five degrees away from the central location, the seat tilting within the range without restriction in response to external pressure applied to the seat surface portion; and an adjustable restriction element for selectively reducing the range to less than plus or minus five degrees.

11. A system according to claim 10, the base further including two carrier bars, the carrier bars extending from the front portion to the rear portion.

12. A system according to claim 10, the rear portion of the base defining a first aperture, the rear portion of the seat defining a first peg, the first peg extending into the first aperture.

13. A system according to claim 12, the base defining a second aperture, the seat including a second peg, the second peg extending into the second aperture, the second aperture being sufficiently small to prevent the seat from tilting beyond the range while the second peg extends into the second aperture.

14. A system according to claim 13, the second aperture being sufficiently large to permit the seat to tilt within the range while the second peg extends into the second aperture.

15. A system according to claim 13, the second aperture being defined in the rear portion of the base.

16. A system according to claim 13, the second aperture being defined in the front portion of the base.

17. A system according to claim 13, the adjustable restriction element comprising a screw for adjusting a size of the second aperture.

18. A system according to claim 10, wherein the range is no more than plus or minus three degrees away from the central location.

\* \* \* \* \*